US009878698B2

(12) United States Patent
Choo

(10) Patent No.: US 9,878,698 B2
(45) Date of Patent: Jan. 30, 2018

(54) PULSATION REDUCTION APPARATUS OF HYDRAULIC PISTON PUMP

(71) Applicant: Mando Corporation, Pyeongtaek-si, Gyeonggi-do (KR)

(72) Inventor: Jeong-Hwan Choo, Seoul (KR)

(73) Assignee: MANDO CORPORATION, Pyeongtaek-si, Geyonggi-do (KR)

( * ) Notice: Subject to any disclaimer, the term of this patent is extended or adjusted under 35 U.S.C. 154(b) by 368 days.

(21) Appl. No.: 14/687,525

(22) Filed: Apr. 15, 2015

(65) Prior Publication Data

US 2015/0292528 A1 Oct. 15, 2015

(30) Foreign Application Priority Data

Apr. 15, 2014 (KR) .................. 10-2014-0044923

(51) Int. Cl.
*B60T 17/02* (2006.01)
*B60T 11/16* (2006.01)
(Continued)

(52) U.S. Cl.
CPC .............. *B60T 17/02* (2013.01); *B60T 7/042* (2013.01); *B60T 8/4068* (2013.01);
(Continued)

(58) Field of Classification Search
CPC ........ B60G 2202/24; B60G 2400/7162; B60T 7/042; B60T 8/4068; B60T 8/4872;
(Continued)

(56) References Cited

U.S. PATENT DOCUMENTS

| 4,989,924 | A  | * | 2/1991 | Toda | ..................... | B60T 8/4068 |
|   |   |   |   |   |   | 137/565.33 |
| 7,686,309 | B2 | * | 3/2010 | Munday | ................. | B60G 21/06 |
|   |   |   |   |   |   | 280/5.504 |
| 8,789,895 | B2 | * | 7/2014 | Park | ........................ | B60T 7/042 |
|   |   |   |   |   |   | 138/30 |

FOREIGN PATENT DOCUMENTS

CN 101061004 A 10/2007
CN 103287420 A 9/2013

OTHER PUBLICATIONS

Chinese Office Action dated Jun. 19, 2017 issued in Korean Patent Application No. 2015-10173933.5 (with English translation).
(Continued)

*Primary Examiner* — Logan Kraft
(74) *Attorney, Agent, or Firm* — McDermott Will & Emery LLP

(57) ABSTRACT

The present invention relates to a pulsation reduction apparatus of a hydraulic piston pump, comprising: a block housing that has one end connected to the first hydraulic circuit and the other end connected to the second hydraulic circuit; a damper that is embedded in the block housing, absorbs pressure resulting from working fluid introduced to the first hydraulic circuit, assists with pressure increase of the second hydraulic circuit, and allows shape deformation; and viscosity damping units that are embedded in the block housing, are arranged between the first hydraulic circuit and the damper and between the second hydraulic circuit and the damper, and reduce viscosity of the working fluid introduced from the first and second hydraulic circuits, thereby reducing pressure pulsation and stably performing shock absorption and pressure increase at the same time with a relatively simple configuration.

7 Claims, 3 Drawing Sheets

(51) Int. Cl.
*F16F 9/30* (2006.01)
*B60T 11/10* (2006.01)
*B60T 7/04* (2006.01)
*B60T 13/14* (2006.01)
*B60T 13/66* (2006.01)
*B60T 13/68* (2006.01)
*B60T 15/36* (2006.01)
*B60T 8/40* (2006.01)

(52) U.S. Cl.
CPC ............. *B60T 11/101* (2013.01); *B60T 11/16* (2013.01); *B60T 13/146* (2013.01); *B60T 13/662* (2013.01); *B60T 13/686* (2013.01); *B60T 15/36* (2013.01); *F16F 9/30* (2013.01); *B60G 2202/24* (2013.01)

(58) Field of Classification Search
CPC ...... B60T 11/101; B60T 11/16; B60T 13/146; B60T 13/662; B60T 13/686; B60T 15/36; B60T 17/02; B60T 17/221; F15B 13/06; F16F 9/53; F16F 9/30
See application file for complete search history.

(56) References Cited

OTHER PUBLICATIONS

Chinese Office Action dated Dec. 5, 2017 issued in Chinse Patent Application No. 201510173933.5.

\* cited by examiner

PULSATION REDUCTION APPARATUS OF HYDRAULIC PISTON PUMP

CROSS-REFERENCE TO RELATED APPLICATION

This application claims priority from and the benefit under 35 U.S.C. §119(a) of Korean Patent Application No. 10-2014-0044923, filed on Apr. 15, 2014, which is hereby incorporated by reference for all purposes as if fully set forth herein.

BACKGROUND OF THE INVENTION

1. Field of the Invention

The present invention relates to a pulsation reduction apparatus of a hydraulic piston pump and, more particularly, to a pulsation reduction apparatus of a hydraulic piston pump which reduces a pressure pulsation and in which shock alleviation and pressure increase are stable and are performed at the same time, with a relatively simple configuration.

2. Description of the Prior Art

A vehicle posture control apparatus (e.g., an Electronic Stability Control; ESC) corresponds to an apparatus for detecting slide by a vehicle itself even without separate control of a driver, thereby controlling pressure and engine output applied to front wheels and rear wheels of the vehicle.

In general, in such an ESC, when working fluid is introduced into two hydraulic circuits, that is, a front-side circuit of the vehicle and a rear-side circuit of the vehicle so as to increase pressure, pulsation of the working fluid is necessarily generated due to an operation of a pump.

Such pulsation causes a change in a signal collected by a pressure sensor, thereby adversely affecting boosting performance.

Although a large number of existing technologies are known and developed in order to reduce such pressure pulsation, most of the technologies have a large number of components and are complex, and thus an increase in production costs is unavoidable.

Further, the existing pressure pulsation reduction apparatuses have a problem in that noise is generated due to interference between components.

Further, a rubber damper provided in the existing pressure pulsation reduction apparatus may be deformed, cracked, or damaged according to torsion due to a pressure difference between the two hydraulic circuits.

SUMMARY OF THE INVENTION

The present invention is conceived to improve the aforementioned problem, and an aspect of the present invention is to provide a pulsation reduction apparatus which reduces a pressure pulsation and in which shock alleviation and pressure increase are stable and are performed at the same time, with a relatively simple configuration.

In order to achieve the above-described aspect, the present invention provides a pulsation reduction apparatus of a hydraulic piston pump, comprising: a first hydraulic circuit that interconnects a master cylinder for forming hydraulic control pressure and wheel brakes provided in a pair of wheels according to an operation of a brake pedal so as to control fluid pressure transmission; a second hydraulic circuit that interconnects a master cylinder for forming hydraulic control pressure and wheel brakes provided in a pair of wheels according to an operation of a brake pedal so as to control fluid pressure transmission; a block housing that has one end connected to the first hydraulic circuit and the other end connected to the second hydraulic circuit; a damper that is embedded in the block housing, absorbs pressure resulting from working fluid introduced to the first hydraulic circuit, assists with pressure increase of the second hydraulic circuit, and allows shape deformation; and viscosity damping units that are embedded in the block housing, are arranged between the first hydraulic circuit and the damper and between the second hydraulic circuit and the damper, and reduce viscosity of the working fluid introduced from the first and second hydraulic circuits.

The present invention having the above configuration can achieve the following effects.

First, the present invention can alleviate shock resulting from pressure of working fluid introduced through a first hydraulic circuit and stably increase pressure of a second hydraulic circuit at the same time with a relative simple configuration in which a damper and a viscosity damping unit are provided inside a block housing disposed between a first hydraulic circuit and a second hydraulic circuit, thereby reducing pulsation and thus improving ride quality.

In particular, the present invention sequentially alleviates shock resulting from an inflow pressure of the working fluid in an order of first and second orifices, the viscosity damping unit, and the damper of the block housing, thereby improving ride quality through a degressive shock absorption effect.

Further, the present invention can disperse and receive pressure of the working fluid directly applied to a damper by the viscosity damping unit to some degree, so that a durability of the damper is improved, thereby increasing lifespan while preventing deformation, crack, and damage resulting from torsion.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, some embodiments of the present invention will be described in detail with reference to the exemplary drawings. In the following description, It should be appreciated that when one component is described as being "connected," "coupled" or "joined" to another component, a third component may be "connected," "coupled," and "joined" between the first and second components, although the first component may be directly connected, coupled or joined to the second component.

Hereinafter, exemplary embodiments of the present invention will be described with reference to the accompanying drawings.

Figure 1:
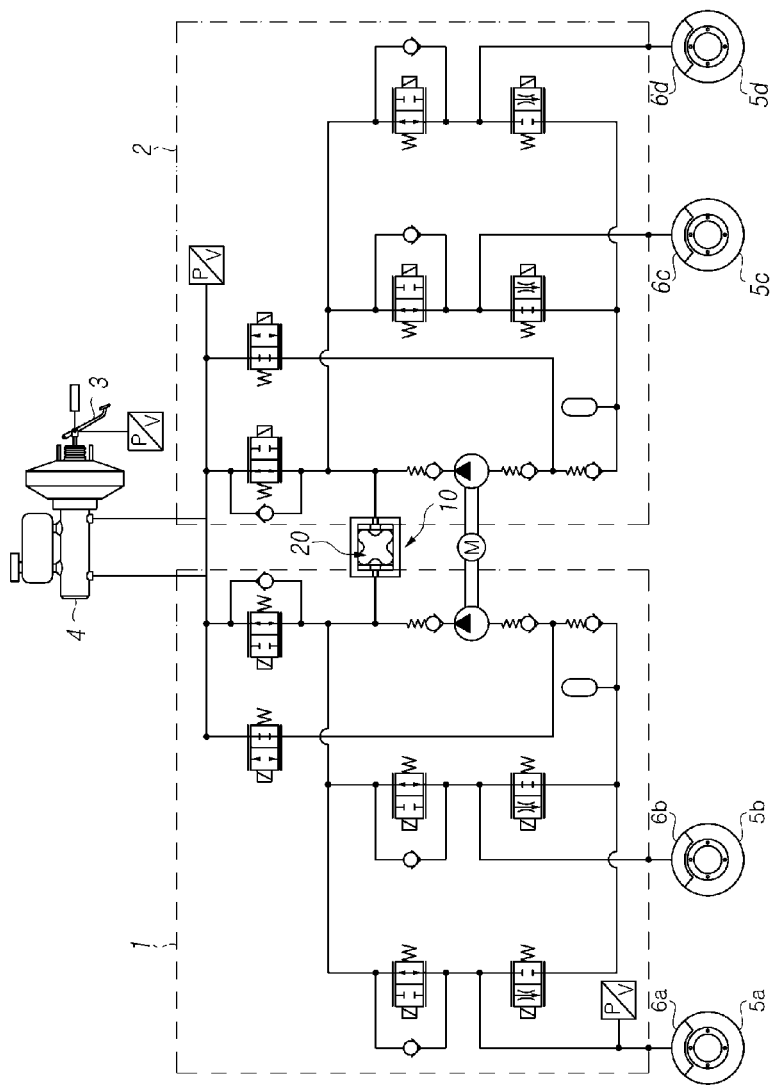
FIG. 1 is a concept view illustrating an overall structure of a hydraulic circuit system in which a pulsation reduction apparatus of a hydraulic piston pump is mounted according to an embodiment of the present invention.

FIG. 1 is a concept view illustrating an overall structure of a hydraulic circuit system in which a pulsation reduction apparatus of a hydraulic piston pump is mounted according to an embodiment of the present invention.

Figure 2:
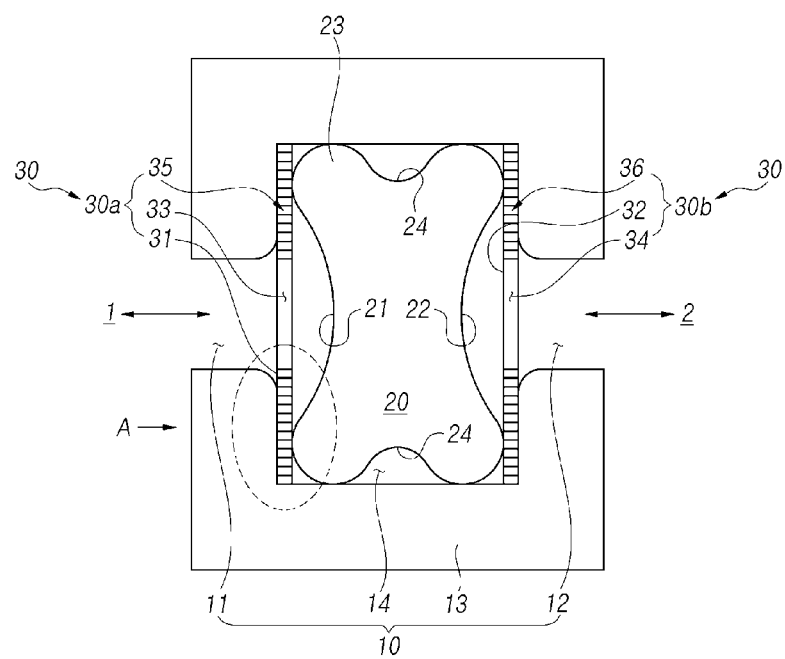
FIG. 2 is a sectional concept view illustrating an overall structure of a pulsation reduction apparatus of a hydraulic piston pump according to an embodiment of the present invention.
Figure 3:
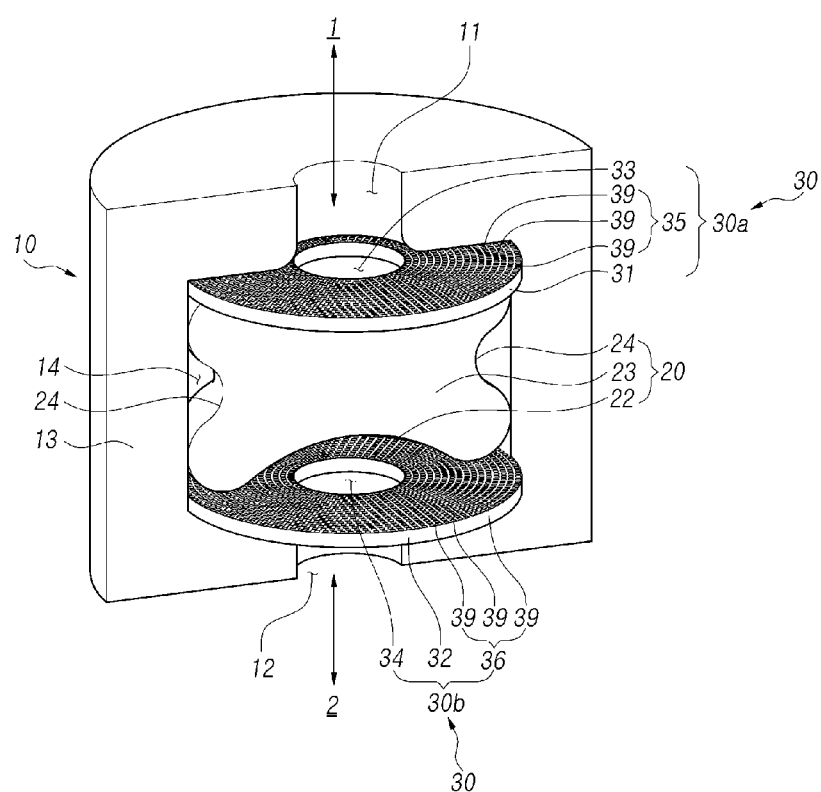
FIG. 3 is a cutaway perspective view illustrating an inner structure of a pulsation reduction apparatus of a hydraulic piston pump according to an embodiment of the present invention.

Further, FIG. 2 is a sectional concept view illustrating an overall structure of a pulsation reduction apparatus of a hydraulic piston pump according to an embodiment of the present invention, and FIG. 3 is a cutaway perspective view illustrating an inner structure of a pulsation reduction apparatus of a hydraulic piston pump according to an embodiment of the present invention.

It can be identified that the present invention has a structure including a first hydraulic circuit 1, a second hydraulic circuit 2, a block housing 10, a damper 20, and a viscous damping unit 30 as illustrated.

The first hydraulic circuit 1 interconnects a master cylinder 4 which forms hydraulic control pressure and wheel brakes 6a and 6b provided in a pair of wheels 5a and 5b, respectively, according to operation of a brake pedal 3, thereby controlling fluid pressure transmission.

The second hydraulic circuit 2 interconnects the master cylinder 4 which forms hydraulic control pressure and wheel brakes 6c and 6d provided in a pair of wheels 5c and 5d, respectively, according to the operation of the brake pedal 3, thereby controlling fluid pressure transmission.

The block housing 10 has one end connected to the first hydraulic circuit 1 and the other end connected to the second hydraulic circuit 2.

The damper 20 is embedded in the block housing, absorbs pressure resulting from working fluid introduced through the first hydraulic circuit 1, assists with a pressure increase of the second hydraulic circuit 2, and allows shape deformation.

The viscous damping units 30 are embedded in the block housing 10, are arranged between the first hydraulic circuit 1 and the damper 20 and between the second hydraulic circuit 2 and the damper 20, and decrease viscosity of the working fluid introduced from the first and second hydraulic circuits 1 and 2.

Thus, the present invention can alleviate shock resulting from inflow pressure of the working fluid in an order of the damper 20 and the viscosity damping unit 30 through the block housing 10, thereby reducing pulsation and improving ride comfort.

In the present invention, the above-described embodiment can be applied, and various embodiments, which will be described below, can also be applied.

It can be identified that the block housing 10 receives the damper 20 and the viscosity damping unit 30 as described above, and corresponds to a structure including a housing body 13 and first and second orifices 11 and 12 as illustrated.

The housing body 13 has an approximately cylindrical inner space 14 in which the damper 20 and the viscosity damping unit 30 are embedded.

The first orifice 11 passes through one end of the housing body 13 to communicate with the inner space 14 and is connected to the first hydraulic circuit 1.

The first orifice 12 passes through the other end of the housing body 13 to communicate with the inner space 14 and is connected to the second hydraulic circuit 2.

Thus, shock, resulting from the pressure of the working fluid introduced to the inner space 14 through the first hydraulic circuit 1 or the second hydraulic circuit 2, is primarily alleviated.

Meanwhile, it can be identified that the damper 20 alleviates shock resulting from the pressure of the working fluid introduced from the first hydraulic circuit 1 or the second hydraulic circuit 2 as described above, and is a structure including a damper body 23 and first and second damping grooves 21 and 22 with reference to FIGS. 2 and 3 as described above.

The damper body 23 is a cylindrical member embedded in the block housing 10, and is preferably made of an elastic material to alleviate shock resulting from the introduction of the working fluid.

The first damping groove 21 is depressed on one surface of the damper body 23, which faces the first hydraulic circuit 1, and allows shape deformation which corresponds to additional depression caused by allowing the first damping groove 21 to receive the working fluid introduced through the first hydraulic circuit 1 and to be pushed toward the second hydraulic circuit 2, that is, the second orifice 12, the sectional surface thereof having an arc shape.

The second damping groove 22 is depressed on the other surface of the damper body 23, which faces the second hydraulic circuit 2, and allows shape deformation which corresponds to additional depression caused by allowing the second damping groove 22 to receive the working fluid introduced through the second hydraulic circuit 2 and to be pushed toward the first hydraulic circuit 1, that is, the first orifice 11, the sectional surface thereof having an arc shape.

Further, the first damping groove 21 and the second damping groove 22 face the viscosity damping unit 30, which will be described below.

Meanwhile, a cylindrical corner part of the damper body 23 is rounded to smoothly disperse shock of the working fluid introduced from the first orifice 11 or the second orifice 12 to an opposite side.

Further, it is preferred that the damper body 23 further includes a shock-absorption ring groove 24 depressed in a ring shape along the side surface of the damper body 23 which interconnects edges of the one surface and the other surface such that the first damping groove 21 and the second damping groove 22 directly receive the working fluid and perform a shock-absorption effect, thereby preventing defects such as torsion or uneven distribution when the shape deformation is performed and helping with shape restoration.

Meanwhile, as described above, it can be identified that the viscosity damping unit 30 reduces viscosity of the working fluid introduced from the first and second hydraulic circuits 1 and 2 and particularly is a structure including a first damping plate 30a and a second damping plate 30b as illustrated in FIGS. 2 and 3 with respect to FIG. 4.

First, the first damping plate 30a is embedded in the block housing 10 to be in contact with one surface of the damper 20, faces the first hydraulic circuit 1, forms a first throughhole 33 formed on a central portion thereof to communicate with the first orifice 11, allows the working fluid to flow toward a central portion of the one surface of the damper 20, and allows the working fluid to flow through the entire surface.

The second damping plate 30b is embedded in the block housing 10 to be in contact with the other surface of the damper 20, faces the second hydraulic circuit 2, forms a second through-hole 34 formed at a central portion thereof to communicate with the second orifice 12, allows the working fluid to flow toward a central portion of the other surface of the damper 20, and allows the working fluid to flow through the entire surface.

Here, the diameters of the first through-hole 33 and the second through-hole 34 are equal to or larger than the diameters of the first orifice 11 and the second orifice 12, thereby easily implementing a shock-absorption performance of the working fluid.

In more detail, the first damping plate 30a is a structure including the first through-hole 33 and a first damping mesh 35 on a first plate body 31.

The first plate body 31 is a circular plate-shaped member, edges of which contact and are fixed on the inner peripheral surface of the cylindrical inner space 14.

The first through-hole 33 is a member which is formed through the center of the first plate body 31 and allows the working fluid to flow towards the central portion of the one surface of the damper 20.

The first damping mesh 35 is formed by a plurality of members formed through the entire surface of the first plate body 31 to reduce viscosity of the working fluid.

That is, the first damping mesh 35 includes a plurality of rectangular through-slots 39 arranged along a plurality of virtual concentric circles C formed from an edge of the first through-hole 33 to an edge of the first plate body 31.

DESCRIPTION OF REFERENCE NUMERALS

1: First hydraulic circuit
2: Second hydraulic circuit
3: Brake pedal
4: Master cylinder
5a, 5b: Pair of wheels provided on one side of vehicle
5c, 5d: Pair of wheels provided on other side of vehicle
6a, 6b, 6c, 6d: Wheel brake
10: Block housing
11: First orifice
12: Second orifice
13: Housing body
14: Inner space
20: Damper
21: First damping groove
22: Second damping groove
23: Damper body
24: Shock-absorption ring groove
30: Viscosity damping unit
30a: First damping plate
30b: Second damping plate
31: First plate body
32: Second plate body
33: First through-hole
34: Second through-hole
35: First damping mesh
36: Second damping mesh
39: Through-slot

What is claimed is:

1. A pulsation reduction apparatus of a hydraulic piston pump, comprising:
a first hydraulic circuit that interconnects a master cylinder for forming hydraulic control pressure and wheel brakes provided in a pair of wheels according to operation of a brake pedal so as to control fluid pressure transmission;
a second hydraulic circuit that interconnects the master cylinder for forming hydraulic control pressure and wheel brakes provided in a pair of wheels according to the operation of the brake pedal so as to control fluid pressure transmission;
a block housing that has one end connected to the first hydraulic circuit and the other end connected to the second hydraulic circuit;
a damper that is embedded in the block housing, absorbs pressure resulting from working fluid introduced to the first hydraulic circuit, assists with pressure increase of the second hydraulic circuit, and allows shape deformation; and
viscosity damping units that are embedded in the block housing, are arranged between the first hydraulic circuit and the damper and between the second hydraulic circuit and the damper, and reduces viscosity of the working fluid introduced from the first and second hydraulic circuits,
wherein the viscosity damping units comprises:
a first damping plate that is embedded in the block housing to be in contact with one surface of the damper, faces the first hydraulic circuit, allows the working fluid to flow to a central portion of the one surface of the damper, and allows the working fluid to flow through an entire surface; and
a second damping plate that is embedded in the block housing to be in contact with the other surface of the damper, faces the second hydraulic circuit, allows the working fluid to flow to a central portion of the other surface of the damper, and allows the working fluid to flow through the entire surface.

2. The pulsation reduction apparatus of a hydraulic piston pump of claim 1, wherein the block housing comprises:
a housing body having an inner space formed therein in which the damper and the viscosity damping units are embedded;
a first orifice that is formed through one end of the housing body to communicate with the inner space and is connected to the first hydraulic circuit; and
a second orifice that is formed through the other end of the housing body to communicate with the inner space and is connected to the second hydraulic circuit,
wherein the viscosity damping units allow flow of the working fluid introduced from the first orifice and the second orifice.

3. The pulsation reduction apparatus of a hydraulic piston pump of claim 1, wherein the first and second damping plates respectively comprise:
circular plate-shaped first and second plate body, edges of which contact and are fixed on an inner peripheral surface of the cylindrical inner space of the block housing;
first and second through-holes that are formed through central portions of the first and second plate bodies and allow the working fluid to flow to the central portion of the one surface of the damper; and
a plurality of first and second damping meshes that is formed through entire surface of the first and second plate bodies and reduce viscosity of the working fluid.

4. The pulsation reduction apparatus of a hydraulic piston pump of claim 1, wherein the damper comprises:
a damper body embedded in the block housing; and
first and second damping grooves formed on one surface and the other surface of the damper body to allow shape deformation.

5. The pulsation reduction apparatus of a hydraulic piston pump of claim 4, wherein the damper body is embedded in the block housing, is formed in a cylindrical shape, and is made of an elastic material to alleviate shock resulting from the introduction of the working fluid.

6. The pulsation reduction apparatus of a hydraulic piston pump of claim 4, wherein the first and second damping grooves are depressed on the one surface and the other surface of the damper body and face the viscosity damping units, and sectional surfaces of the first and second damping grooves have arc shapes.

7. The pulsation reduction apparatus of a hydraulic piston pump of claim 4, wherein the damper body comprises a Shock-absorption ring groove depressed in a ring shape along a side surface of the damper body which interconnects edges of the one surface and the other surface.

\* \* \* \* \*